Figure 1:
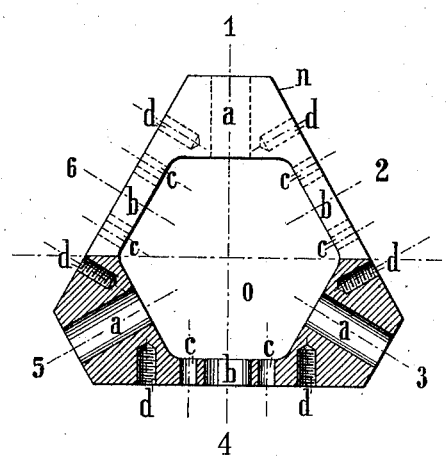

P. VOGEL.
TURRET.
APPLICATION FILED NOV. 14, 1911.

1,038,242.

Patented Sept. 10, 1912.

Witnesses:
H. P. Roberts
C. A. Mason

Inventor.
Paul Vogel,
by W. Schoenborn
assoc. Attorney

UNITED STATES PATENT OFFICE.

PAUL VOGEL, OF COLOGNE-DEUTZ, GERMANY.

TURRET.

1,038,242.
Specification of Letters Patent.
Patented Sept. 10, 1912.

Application filed November 14, 1911. Serial No. 660,212.

*To all whom it may concern:*

Be it known that I, PAUL VOGEL, a subject of the German Emperor, and resident of Rhein Allee, Cologne-Deutz, in the Kingdom of Prussia, German Empire, have invented new and useful Improvements in Turrets, of which the following is a full, clear, and exact specification.

My invention relates to turrets for use in lathes and analogous machines, and more especially to such turrets as are in the well known manner first held stationary in the lathe or other machine with various tools applied thereto and are subsequently advanced to cause one of the tools to operate on the piece of work while the latter is being rotated by the lathe or other machine, whereupon the turret is moved back again, rotated on its axis into another angular position, and secured therein by means of a screw or otherwise, to be again advanced toward the rotating piece of work so as to cause another tool to operate thereon. The means for securing the tools in turrets of this well known class have heretofore generally embodied one or the other of the following arrangements. According to one system smooth openings extending diametrically through the turret have been provided for receiving the shanks of tools to be held therein. This arrangement has generally been applied in the case of turrets consisting of a solid body of either round outer shape or of polygonal shape with face portions of equal or unequal lengths. According to another system, usually employed in connection with solid polygonal turrets having outer faces of either equal or unequal lengths, threaded openings have been formed therein on the outside for screwing on suitable tools from without. According to a third system screw openings have been made to extend outward through the comparatively thin side walls of the turret from an inner cavity of the latter, and in addition to these screw openings smooth centering openings have been bored through the side walls of the turret, both these kinds of openings being intended for flanged tools to be secured on the turret by means of nuts screwed on to corresponding threaded extensions of the said flanged tools from within the cavity of the turret. This third system has usually been applied in the case of polygonal turrets having side faces of equal lengths and an inner cavity. In some cases the first and second systems above referred to have been combined, but it has not heretofore been possible to combine therewith also the third system. This was due to the fact that in the case of polygonal turrets, no matter whether the side faces were equal or unequal, the available space was insufficient, whereas when providing such thin side walls as would be required for securing flanged tools from the inside there was not a sufficient depth or thickness of material to allow of providing the other openings, and vice versa.

The object of my present invention is to overcome these difficulties and to provide a turret which will be adapted for securing thereon shank tools as well as flanged tools, and either from within or without, or both, as may be desired.

To this end my invention consists in a turret of polygonal shape with outer side faces of varying lengths having an inner cavity so disposed in the turret, and various kinds of openings so provided in the side walls, as to enable any and all these systems of fastening to be applied either severally or in combination, as may be desired.

Figure 2:
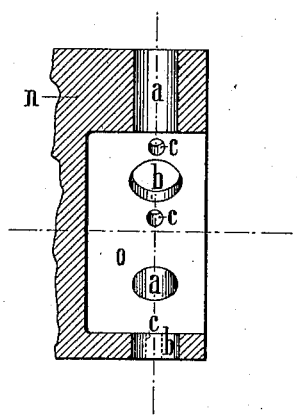
Figure 3:
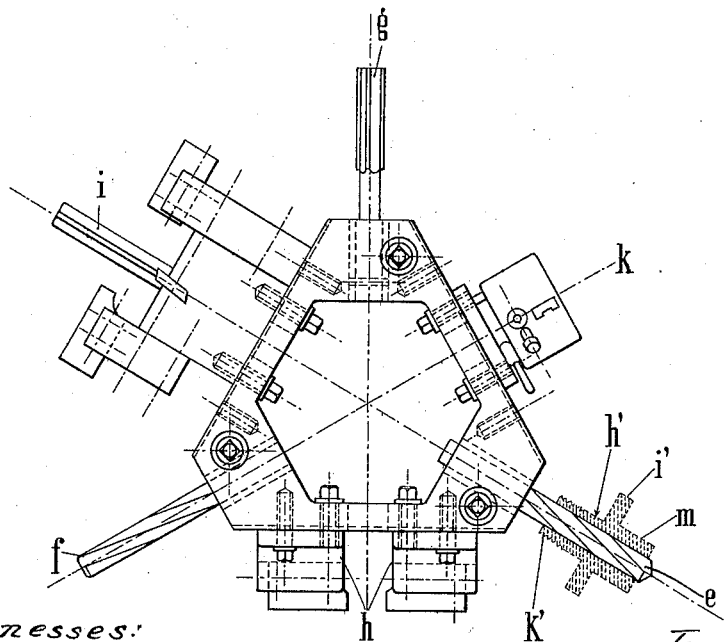

In the drawing Figure 1 is a plan view, partly in section, and Fig. 2 a sectional view, on the line 1—4 of Fig. 1, with parts broken away, of a turret embodying my invention. Fig. 3 is a plan view similar to Fig. 1, showing various tools secured to the turret in different ways.

As shown in Figs. 1 and 2 the turret $n$ is of polygonal shape with alternately long and short outer side faces and an inner cavity $o$ so shaped and disposed relatively thereto as to provide side walls of narrow cross section at the long outer side faces 2, 4, 6, and side walls of broad cross section at the short outer side faces 1, 3, 5. Openings $a$ extending through the broad section side walls 1, 3 and 5 are provided for receiving shank tools, while centering openings $b$ and other openings $c$ for receiving flanged tools to be secured from within the cavity of the turret extend through the narrow section side walls 2, 4 and 6. Between the openings $a$, on the one hand, and the openings $b$ and $c$, on the other hand, are provided outer screw-thread openings $d$ for screwing on tools from without. By reason of the varying lengths of the outer side faces and the configuration of the inner cavity, which renders the cross section of the longer side walls 2, 4, 6 narrow only at the middle portion of their length, a sufficient depth of material is obtained near the shorter side walls 1, 3, 5, to accommodate the said outer threaded openings $d$ in the longer side walls 2, 4, 6, near the openings $a$.

As shown in Fig. 3 by way of example seven tools are secured to a turret of the kind illustrated in Figs. 1 and 2. The tools $e$, $f$ and $g$ are shank tools (drills). The two tools $h$ are intended for operating on the portion $h'$ of the piece of work $m$, and they are each secured both from within and without the turret. $i$ is a tool secured from within and $k$ another tool secured in the same way. Other tools might be secured by means of the outer screws alone entering the openings $d$.

What I claim is:—

1. In a turret of polygonal shape with alternately long and short outer side faces, and providing an inner cavity, wall portions of narrow cross section at the long side faces and other wall portions of broad cross section at the short side faces, said wall portions being provided with tool-receiving openings in the short side faces and with other tool-receiving openings in the long side faces.

2. In a turret of polygonal shape with alternately long and short outer side faces and providing an inner cavity, wall portions of narrow cross section at the long side faces and other wall portions of broad cross section at the short side faces, said wall portions being provided with tool receiving openings in the short side faces, with other tool receiving openings extending through the side wall portions at the long side faces, and with openings extending from the long side faces partly into the wall portions of broad cross section.

3. In a turret of polygonal shape with alternately long and short outer side faces and providing an inner cavity, wall portions of narrow cross-section at the long side faces and other wall portion of broad cross section at the short side faces, said wall portions being provided with tool receiving openings in the short side faces, with two other tool receiving openings and a centering opening in each of the side wall portions of the long side faces, and with threaded openings extending from the long side faces partly into the wall portions of broad cross section.

4. In a turret of polygonal shape with alternately long and short outer side faces and providing an inner cavity, wall portions of narrow cross-section at the long side faces and other wall portions of broad cross section at the short side faces, said wall portions being provided with tool receiving openings in the short side faces, extending through the corresponding wall portions for receiving shank tools, with two other tool receiving openings and a centering opening for receiving flanged tools and extending through each of the side wall portions at the long side faces, and with threaded openings extending from the long side faces partly into the wall portions of broad cross section.

5. In a turret of polygonal shape with alternately long and short outer side faces and providing an inner, equilateral, polygonal cavity, wall portions of narrow cross section at the long side faces and other wall portions of broad cross section at the short side faces, said wall portions being provided with tool receiving openings in the short side faces and extending through the corresponding wall portions for receiving shank tools, with two other tool receiving openings and a centering opening extending through each of the wall portions at the long side faces for receiving flanged tools, and with threaded openings extending from the long side faces partly into the wall portions of broad cross section.

In testimony, that I claim the foregoing as my invention, I have signed my name in presence of two subscribing witnesses.

PAUL VOGEL.

Witnesses:
F. W. JAEGER,
FRED'K. F. SCHUETZ.

Copies of this patent may be obtained for five cents each, by addressing the "Commissioner of Patents, Washington, D. C."